United States Patent [19]
Harpman et al.

[11] Patent Number: 5,996,510
[45] Date of Patent: Dec. 7, 1999

[54] CORRUGATED CARDBOARD PALLET

[76] Inventors: Richard C. Harpman, 2485 Timothy Knoll, Poland, Ohio 44514; Charles P. Keip, 1052 Byron Rd., Byron Center, Mich. 49315

[21] Appl. No.: 09/227,848

[22] Filed: Jan. 11, 1999

[51] Int. Cl.⁶ .................................................. B65D 19/00
[52] U.S. Cl. ............................................................ 108/51.3
[58] Field of Search ........................... 108/51.3, 51.11, 108/56.1, 56.3

[56] References Cited

U.S. PATENT DOCUMENTS

| | | | |
|---|---|---|---|
| 2,957,668 | 10/1960 | Norquist et al. | 108/51.3 |
| 2,997,266 | 8/1961 | Munroe | 108/51.3 |
| 3,026,015 | 3/1962 | Severn | 108/51.3 X |
| 3,236,197 | 2/1966 | Rossner | 108/51.3 |
| 4,303,020 | 12/1981 | Houle | 108/51.3 |
| 4,963,024 | 10/1990 | Booth | 108/51.3 X |
| 5,001,991 | 3/1991 | Smith . | |
| 5,076,176 | 12/1991 | Clasen . | |
| 5,129,329 | 7/1992 | Clasen . | |
| 5,176,090 | 1/1993 | Roberts et al. | 108/51.3 |
| 5,195,440 | 3/1993 | Gottlieb . | |
| 5,493,962 | 2/1996 | McCarthy . | |
| 5,528,994 | 6/1996 | Iseli . | |
| 5,595,125 | 1/1997 | Bridges, Jr. | 108/51.3 |
| 5,601,035 | 2/1997 | Herring et al. . | |
| 5,660,118 | 8/1997 | Adams, Jr. | 108/51.3 |

FOREIGN PATENT DOCUMENTS

| | | | |
|---|---|---|---|
| 2676713 | 11/1992 | France | 108/53.1 |
| 6-239345 | 8/1994 | Japan | 108/51.3 |

*Primary Examiner*—Jose V. Chen
*Attorney, Agent, or Firm*—Harpman & Harpman

[57] ABSTRACT

A shipping pallet having strong lightweight recyclable support surfaces and rigid reusable support stringers incorporated within. The pallet uses corrugated cardboard sheets that are precision cut and scored to be formed about the rigid reusable support stringers. A cardboard reinforcing surface sheet is secured by adhesive bond to the enclosed support stringers defining a completed pallet.

17 Claims, 6 Drawing Sheets

CORRUGATED CARDBOARD PALLET

BACKGROUND OF THE INVENTION

1. Technical Field

This invention relates to shipping pallets that are used for material handling and shipping of palletized loads in the shipping industry.

2. Description of Prior Art

Prior art shipping pallets have traditionally been made of wood planks that are nailed to spaced wood supports. The wood planks are nailed to the top and bottom surfaces of the wood supports defining a self-supporting elevated platform on which loads can be placed. The wood planks and supports are typically spaced in relation to one another and allow access for a forklift to slide under the upper planks in two access channels formed between the wood supports. While wood pallets are durable and easy to manufacture, they have a limited useful life due to the abuse during use. High quality wood pallets are repairable and reused, if possible, until they are significantly damaged and must be discarded.

Low quality or standard wood pallets are most often used for limited reshipping purposes or one-way shipping environments wherein the receiver of the palletized goods has no specific need for the pallet once received and thus becomes a disposal liability. Attempts to recycle the standard wood pallet have met with various degrees of success due to the labor involved in disassembly the damaged pallets and safety issues for workers handling wood with rusty nails, etc.

A solution to the problem associated with the disposal of wood pallets have been the introduction of the paper or cardboard pallets. Paper pallets have been made out of a variety of paper construction elements such as honeycomb, corrugated cardboard and pre-formed paper shapes such as cylinders and tubes. By use of paper pallets, allows for the total recycling of the pallet by shredding, baling and disposal as recycled paper. Paper pallets introduce a new series of problems, such as moisture, durability and load capacity versus fabrication costs. Thus the only lightweight load bearing paper pallets have been successful in the marketplace for certain load and weight requirements such as air freight or limited indoor or inter-plant shipping.

Such examples of paper pallets can be seen in U.S. Pat. Nos. 5,001,991, 5,076,176, 5,129,329, 5,195,440, 5,493,962 and 5,528,994.

In U.S. Pat. No. 5,001,991 a corrugated pallet construction can be seen having a plurality of cross support tubes engaged through stringers of tri-folded cardboard construction.

U.S. Pat. No. 5,076,176 is directed to a corrugated cardboard pallet having platform slats made of multiple layers of cardboard glued together. Transversely extending cross slots define support stringers with a plurality of spacer blocks all formed of laminated layers of corrugated cardboard.

U.S. Pat. No. 5,129,329 is a modified form of U.S. Patent ending in 176 that introduces an alternate construction wherein the top and bottom paper slats are to be formed of wood.

U.S. Pat. No. 5,195,440 discloses a paper pallet formed from sheets of foldable material. Support stringers are formed from tubular construction having tubular reinforcing vents provided within.

U.S. Pat. No. 5,493,962 claims a lightweight paper pallet having honeycomb load supporting surface structure secured to support beams made of channels of corrugated cardboard with spacer support blocks within.

A cardboard pallet can be seen in U.S. Pat. No. 5,528,994 having a sandwich and glued cardboard sheet construction and interdisposed support and spacing slots and blocks formed of laminated corrugated cardboard products.

Finally, in U.S. Pat. No. 5,601,035 a cardboard pallet is shown made of multiple layers of corrugated cardboard bonded together forming load supporting surface sheets and intersecting cross cardboard beams.

SUMMARY OF THE INVENTION

The recyclable shipping pallet of the invention combines a totally recyclable load support surface and durable reusable structural stringers in a general use pallet. Multi-layered cardboard forms an upper load engagement surface and encloses the load bearing reusable stringers securing them within the structure. Such construction defines minimum non-supported spans across the pallet's load bearing surfaces.

DESCRIPTION OF THE PREFERRED EMBODIMENT

Referring to FIGS. 1–3 and 7 of the drawings, a recyclable shipping pallet 10 of the invention can be seen having a main body member 11 which defines a deck or support surface for goods or materials. The main body member 11 is composed of a multiple layer of fluted (corrugated) cardboard material 12, best seen in FIG. 3 of the drawings. The main body member 11 is of a flat, generally rectangular shape as illustrated in FIG. 8 that has a plurality of elongated spaced parallel bending scores 13 extending transversely across indicated by broken lines.

Figure 1:
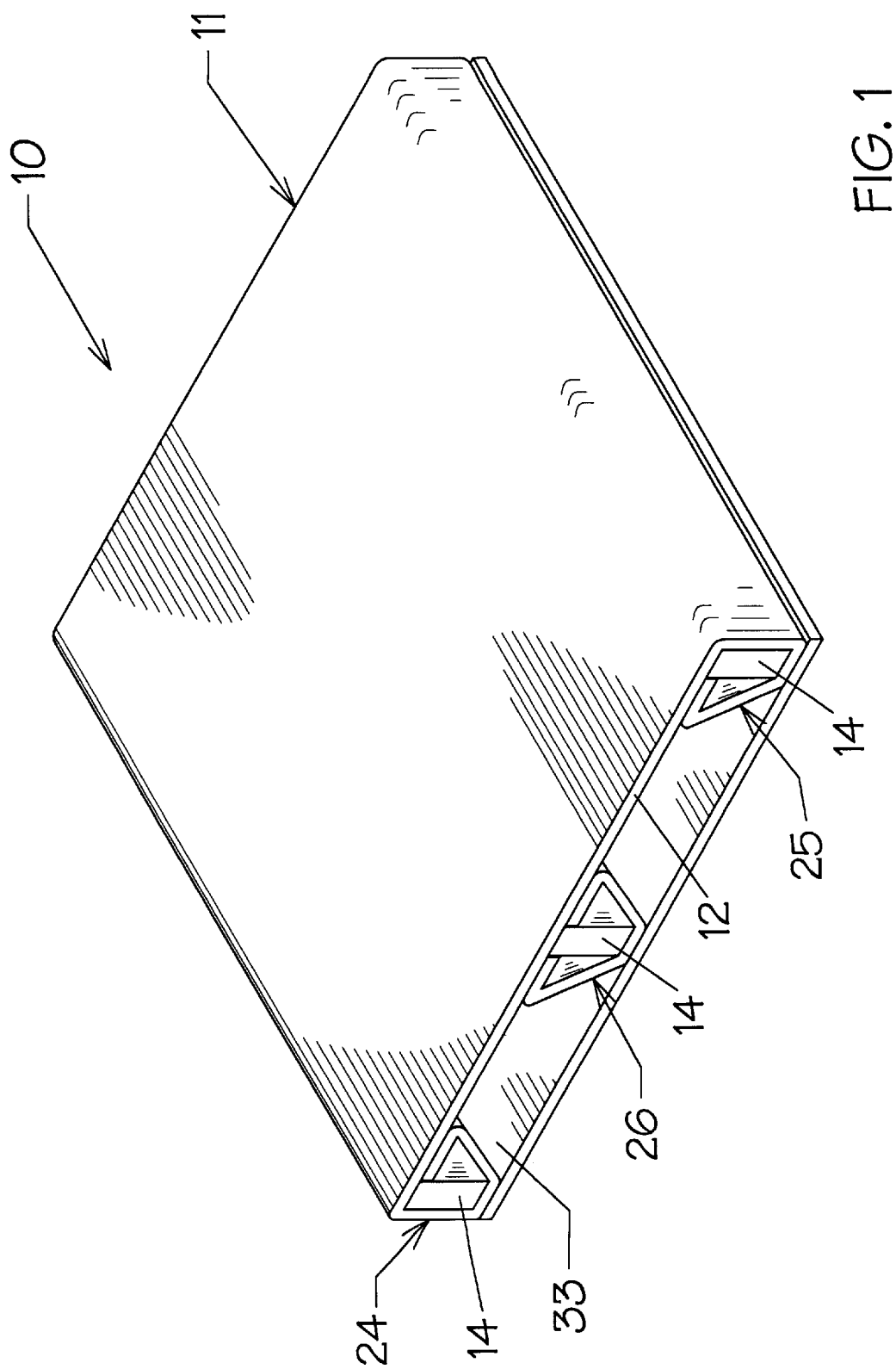
FIG. 1 is a top, front and side perspective view of the pallet of the invention.
Figure 2:
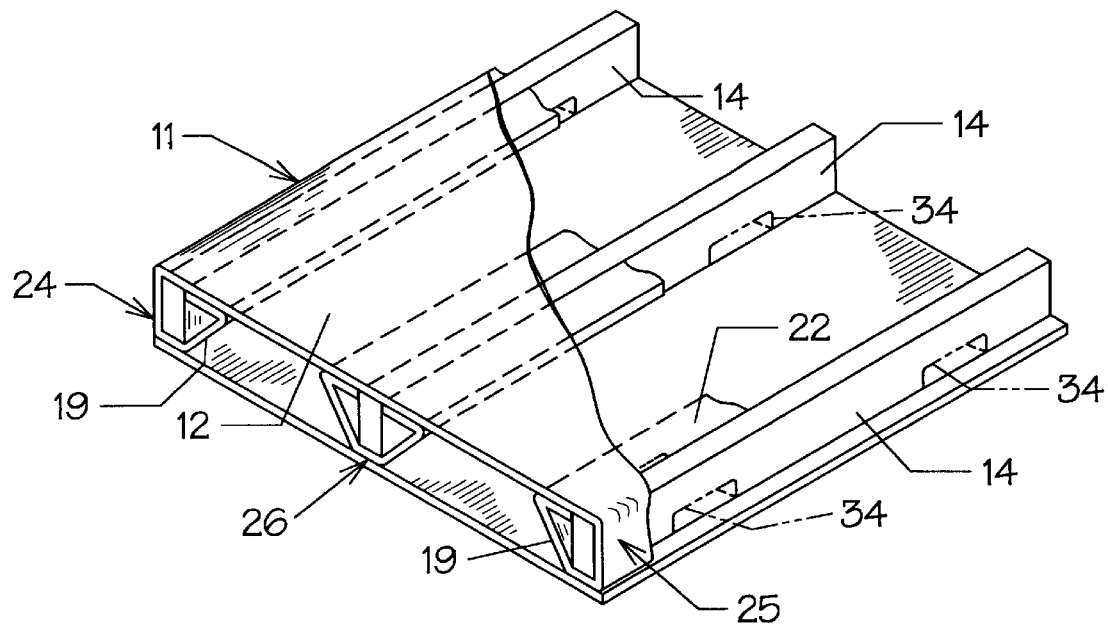
FIG. 2 is a top, front and side perspective view with portions cut-away of the pallet of the invention.
Figure 3:
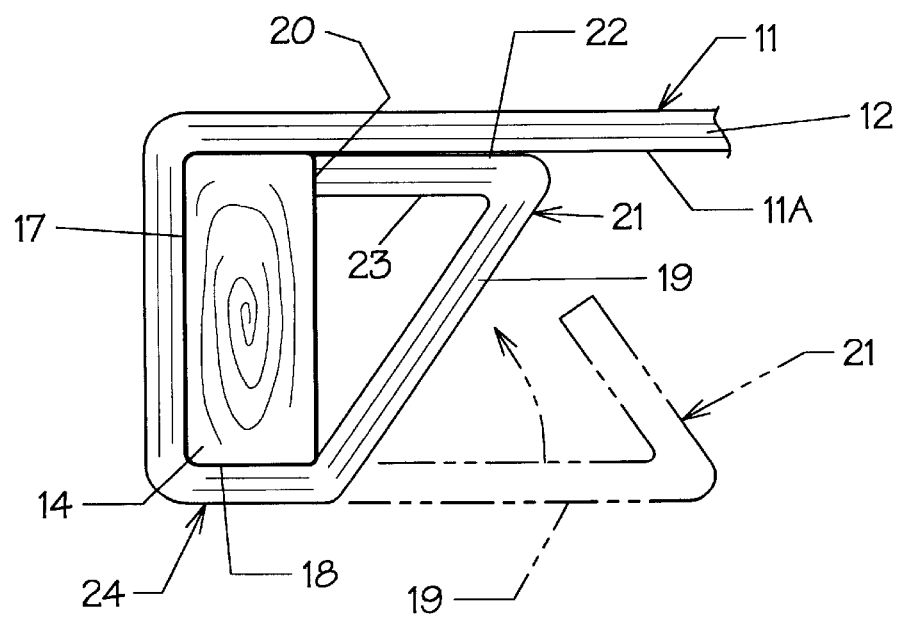
FIG. 3 is an enlarged front elevational view with portions cut-away and in broken lines.

Reusable rigid stringers 14 (preferably of wood) are incorporated within the shipping pallet 10 by folding and fastening the pre-scored main body member 11 thereabout at oppositely disposed ends 15 and 16 as illustrated in FIG. 3 of the drawings. By folding the scored portions of the main body member 11 around outer surfaces 17 and 18 of the respective stringer 14 and then extending angularly at 19 for return engagement with an underside surface 11A of the main body member 11 back against the stringers 14 at 20 a strong support brace 21 is formed.

Brace engagement surface portions 22 extends inwardly from the ends 15 and 16 of the main body member 11 are secured to the hereinbefore described underside surface 11A by adhesive forming a double thick upper brace support portion 23 of the support brace 21 as hereinbefore described.

Correspondingly, each of the rigid stringers 14 within the folded end support braces 21 define outboard pallet support legs 24 and 25.

Figure 6:
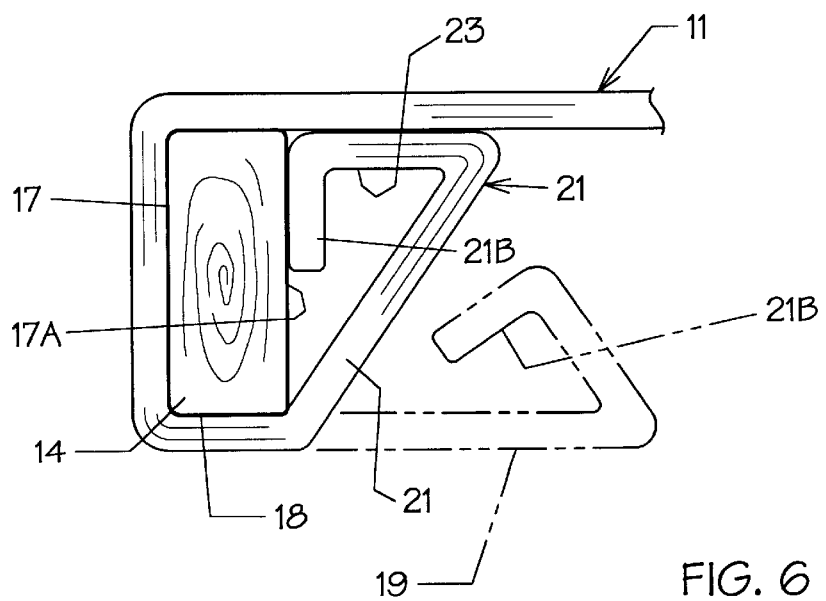
FIG. 6 is an enlarged front elevational view of an alternate form of the invention construction corresponding to FIG. 3 of the drawings.

An alternate support brace 21A can be seen in FIG. 6 of the drawings in which the scored portions of the main body member 11 are folded about the stringers 14 with the addition of an alternate score fold defining a stringer engagement flap 21B that abuts an inside surface 17A of the stringer 14.

Figure 4:
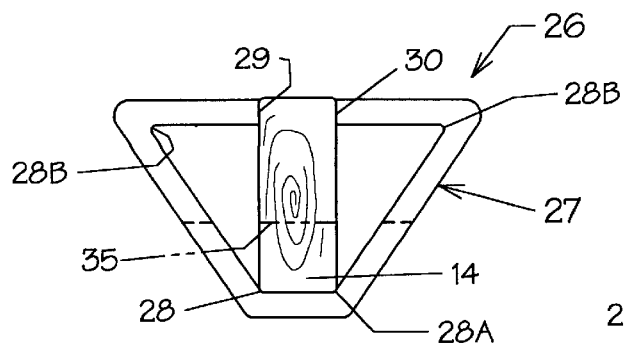
FIG. 4 is an enlarged front elevational view of a center stringer support assembly of the invention.

Referring now to FIGS. 1, 2, 4, 8 and 9 of the drawings, a center support leg 26 can be seen comprised of one of the reusable stringers 14 within a folded cardboard body member 27 having pairs of multiple score lines 28 and 28A within. The stringer 14 is positioned upright between respective score line pair 28 and 28A with the body member 27's free ends at 29 and 30 folded up angularly on the score line 28B against the stringer 14 as best seen in FIG. 4 of the drawings. The center support leg 26 is secured to the underside 11A of the main body member 11 along a center line C by adhesive. A bottom deck 33 of cardboard is secured to the respective support legs 24, 25 and 26 completing the assembly.

Figure 5:
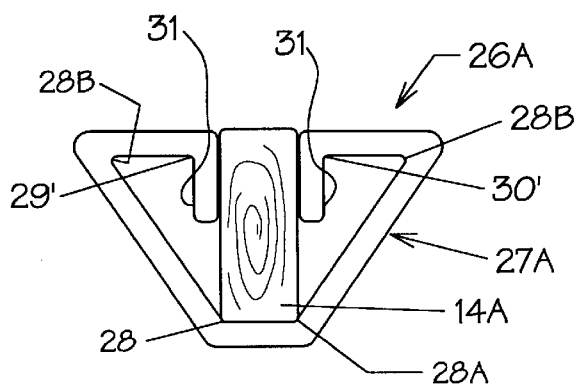
FIG. 5 is an enlarged front elevational view of an alternate center support stringer assembly.
Figure 9:
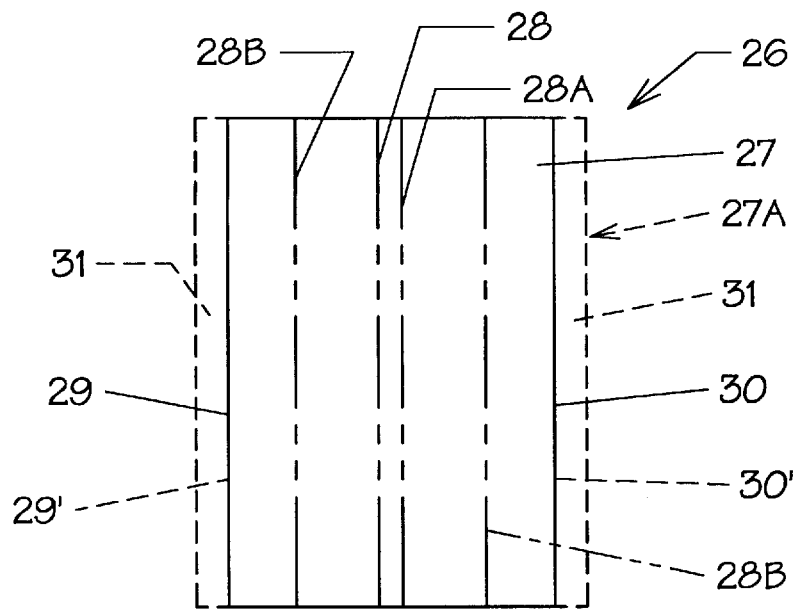
FIG. 9 is a top plan view of a center support cardboard blank with scored lines indicated thereon before assembly.

An alternate center leg assembly 26A can be seen in FIGS. 5 and 9 of the drawings wherein an alternate body member 27A shown in dotted lines in FIG. 9 of the drawings having an increased external dimension with additional score lines at 29' and 30' to define a pair of oppositely disposed engagement flaps 31 that are folded in abutting relation with the surface of an alternate stringer 14A.

It will be evident from the above description that by use of the precision score lines 13, 28, 28A and 28B that the stringers 14 are held in a high frictional co-efficient relationship within the surrounding folded material reducing the need for additional adhesive and therefore simplifying the recycling of the cardboard and reuse of the stringers 14 once removed from the pallet configuration after use.

Figure 7:
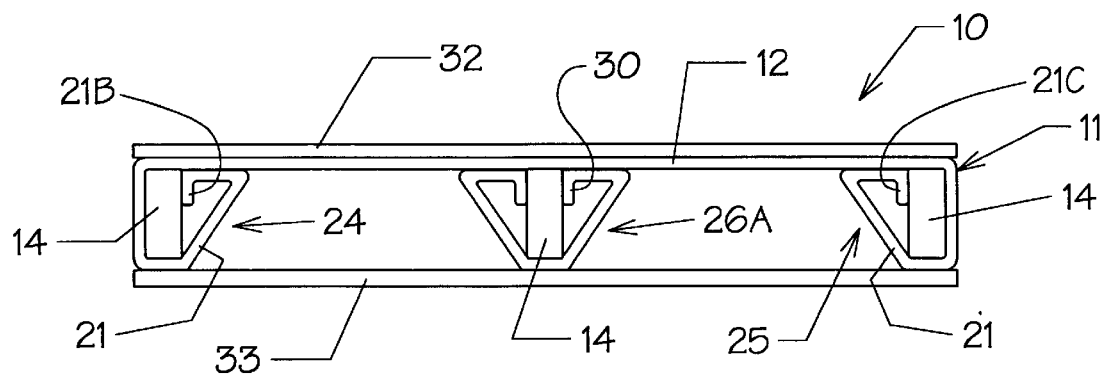
FIG. 7 is a front elevational view of the alternate form of the invention with portions shown in broken lines.
Figure 8:
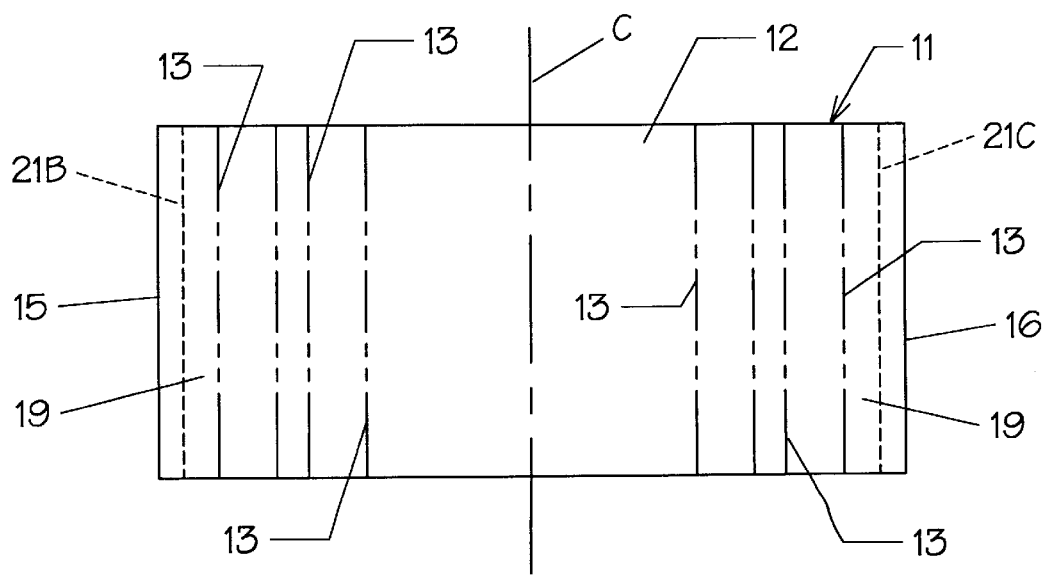
FIG. 8 is a top plan view of the cardboard blank for pallet assembly illustrating in broken lines the multiple score/fold lines.

Referring now to FIG. 7 of the drawings, the shipping pallet 10 of the invention can be seen having an alternate reinforcing deck 32 secured on its upper surface of the main body member 11 by adhesives. The reinforcing deck 32 is of the same triple layer corrugated cardboard material 12 hereinbefore described and affords increased load capacity to the pallet. The bottom deck 33 will help stabilize and the respective support legs 24, 25 and 26 as shown to afford extended use as a "standard reversible pallet" found within the industry and well known to those skilled in the art.

Figure 10:
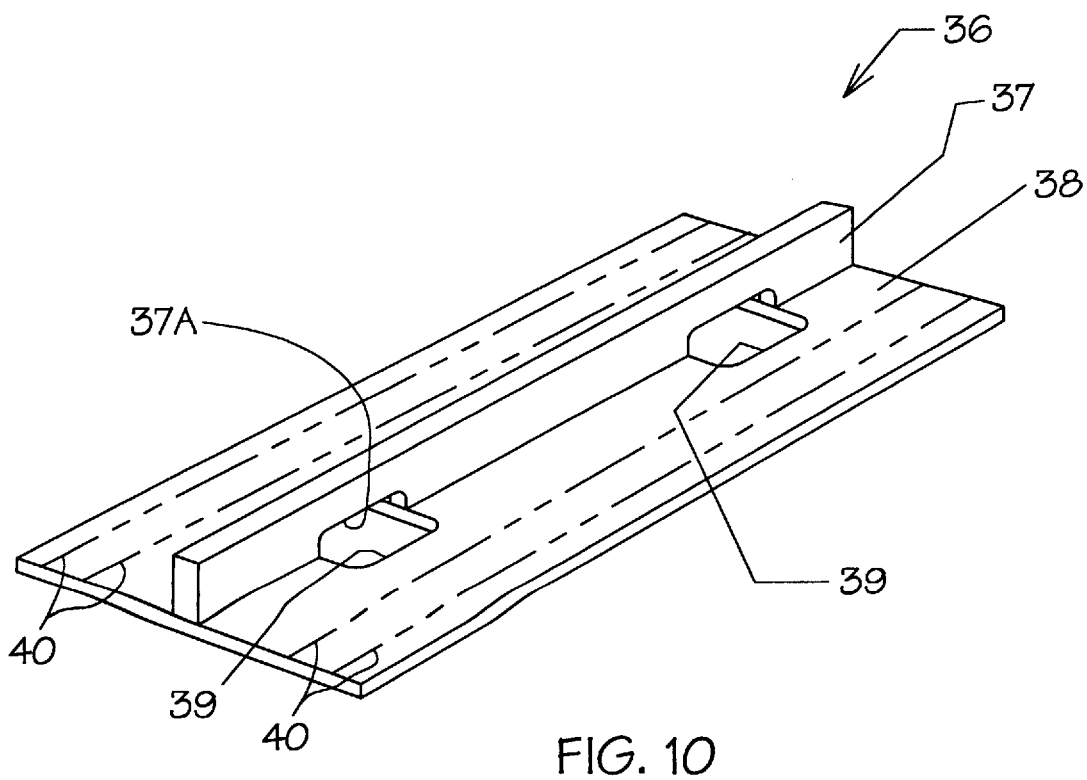
FIG. 10 is a top, front and side perspective view of an alternate center support stringer assembly before assembly.
Figure 11:
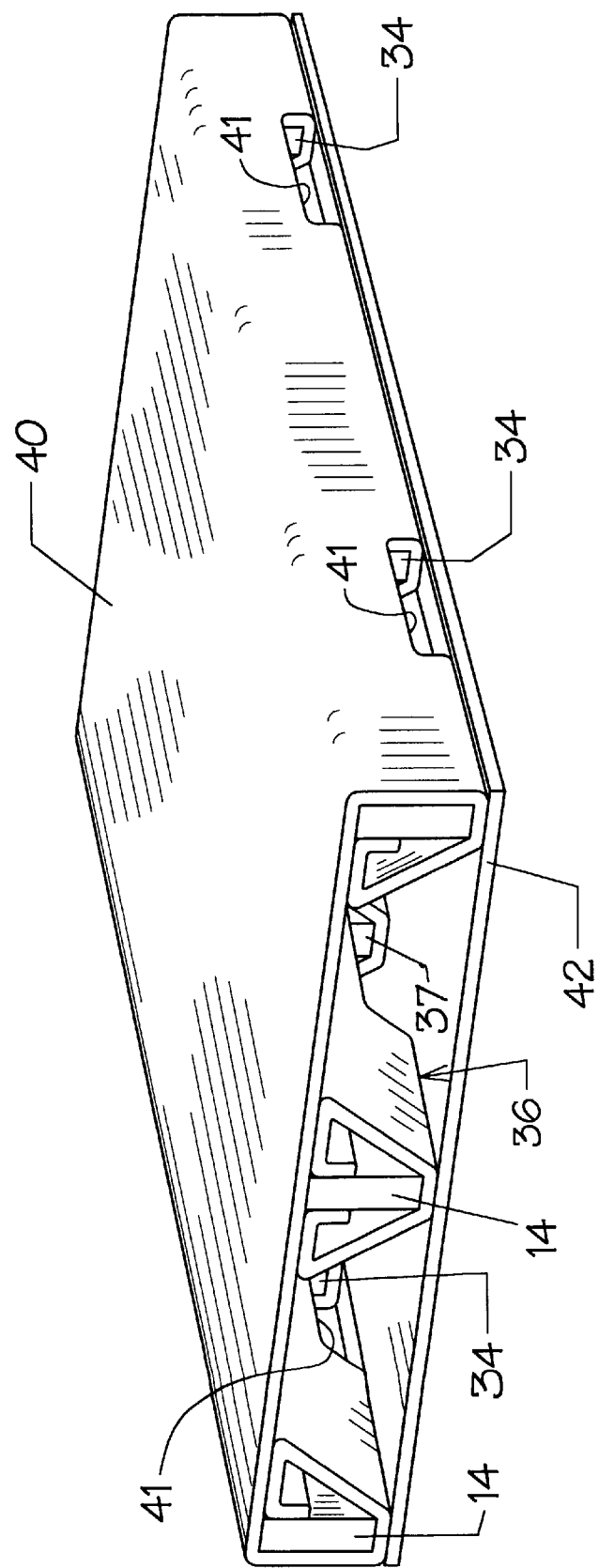
FIG. 11 is a view of an alternate four-way entry pallet.

An alternate form of the invention can be seen in broken lines in FIGS. 8 of the drawings and in solid lines in FIGS. 10 and 11 of the drawings wherein a provision for a four-way entry pallet is illustrated in which the stringers 14 have multiple notched areas 34 with corresponding aligned cut-out areas 35 in the main body member 11.

Referring now to FIG. 10 of the drawings, an alternate center notch leg construction 36 can be seen having a modified stringer 37 with a pair of longitudinal spaced notches at 37A therein. A center leg corrugated cardboard body member 38 has a pair of cut-outs at 39 in center line alignment with the notches 37A. It will be apparent that when the corrugated cardboard body member 38 is folded around the stringer 37 on the multiple score lines 40 as hereinbefore described in the leg assembly 26A, the leg construction 36 will provide a pair of longitudinally spaced access ports therein which will correspondingly align with said notch openings as hereinbefore described in the alternate four-way entry pallet construction.

Referring to FIG. 11 of the drawings, the complete alternate four-way entry pallet can be seen having the multiple support stringers 14 notched at 34 and 37A respectively and a modified main cardboard body member 41 with multiple cut-outs at 42 corresponding to the hereinbefore described notches at 34 and a bottom interconnected deck 43.

In each of the modified embodiments discussed above a corrugated cardboard body member is used to enclose and hold rigid reusable support stringers preferably made of wood which provides a high bred pallet construction having increased load capability and complete recyclability in which the cardboard can be totally recycled at the final destination and the reusable stringers return to the manufacturer for reuse.

Accordingly, it will be apparent to those skilled in the art that various changes and modifications may be made therein without departing from the spirit of the invention.

Therefore we claim:

1. A recyclable shipping pallet comprising in combination, a main cardboard pallet body member having a central load engagement portion and opposing end edge portions, said pallet body member having an upper load engagement surface and an underside surface, a plurality of fold lines extending inwardly in spaced parallel relation from said respective end edge portions, rigid reusable stringers secured within the end edge portions by said fold lines, support braces formed from said end edge portions comprises and angular extending portion and a return engagement portion extending from said respective stringers, said return portion secured to the underside surface of said load engagement portion, a central support leg secured to said central load engagement portion in spaced relation to said end edge portions, said central support leg comprising an elongated folded cardboard body member with a rigid reusable stringer held within, means for securing said stringers within said respective end edge portions and means for reinforcing said main cardboard pallet body member.

2. The recyclable shipping pallet set forth in claim 1 wherein said main cardboard pallet body member is preferably made of a triple layer corrugated paper fiber material.

3. The recyclable shipping pallet set forth in claim 1 wherein said fold lines in said main cardboard body member are in spaced parallel relation to one another and define a pair of elongated support braces extending from said folded stringers.

4. The recyclable shipping pallet set forth in claim 1 wherein said central support leg has an elongated upper engagement surface of a known transverse dimension and a lower ground engagement surface of a transverse dimension less than that of said upper engagement surface.

5. The recyclable shipping pallet set forth in claim 1 wherein said means for securing said stringers within said respective end edge portions comprises; engagement flaps registerable with said underside surface of said main pallet body member and in abutting relation with the respective stringers.

6. The recyclable shipping pallet set forth in claim 1 wherein said means for reinforcing said main cardboard body member comprises, a reinforcing deck secured to the upper load engagement surface of said central load engagement portion and a bottom deck secured to and between said respective end edge portions.

7. The recyclable shipping pallet set forth in claim 5 wherein said reinforcing deck is made from triple layer corrugated cardboard.

8. A recyclable shipping pallet comprising in combination, a main cardboard pallet body member having a central load engagement portion and opposing end edge portions, a plurality of score lines extending inwardly in spaced parallel relation from said respective end edge portions, a plurality of openings in said respective end edge portions, rigid stringers folded within said respective end edge portions, said rigid stringers having longitudinally spaced access notches within in registerable alignment with said openings in said respective end edge portions, support braces formed by the end edge portions extend from the respective stringers and are secured to the central load engagement portion, a central support leg secured to said central load engagement portion in spaced relation to said end edge portions, said central support leg comprising an apertured cardboard body member having a plurality of fold lines, a rigid reusable stringer folded within said fold lines, said stringer having longitudinal spaced access notches within, means for securing said stringers within said respective end edge portions and said apertured cardboard body member, and means for reinforcing said main cardboard pallet body member.

9. The recyclable shipping pallet set forth in claim 8 wherein said rigid reusable stringers folded within said respective end edge portions define elongated end support legs.

10. The recyclable shipping pallet set forth in claim 8 wherein said support braces comprise, an angularly extending portion from said stringer and a return engagement portion secured to said central load engagement portion adjacent said rigid stringer.

11. The recyclable shipping pallet set forth in claim 8 wherein said main cardboard pallet body member is preferably made of a triple layer corrugated paper fiber material.

12. The recyclable shipping pallet set forth in claim 8 wherein said support braces extend in oppositely disposed angular relation from said respective rigid stringer to said central load engagement portion.

13. The recyclable shipping pallet set forth in claim 8 wherein said notched rigid stringers are preferably made of wood.

14. The recyclable shipping pallet set forth in claim 8 wherein said central leg support has an elongated upper engagement surface of a known transverse dimension and a lower ground engagement surface of a transverse dimension less that that of said elongated upper surface.

15. The recyclable shipping pallet set forth in claim 8 wherein said means for reinforcing said main cardboard body member comprises, a bottom deck secured to and between respective folded edge portions and said central support leg in spaced vertical relation to said central load engagement portion.

16. The recyclable shipping pallet set forth in claim 8 wherein said bottom deck is made from triple layer corrugated cardboard.

17. The recyclable shipping pallet set forth in claim 8 wherein said means for securing said stringers within said respective end edge portions and said apertured cardboard body member comprises; engagement flaps registerable with said underside surface of said main pallet body member and in abutting relation with the adjacent surface of said respective stringers.

\* \* \* \* \*